(12) United States Patent
Singh et al.

(10) Patent No.: US 9,276,713 B2
(45) Date of Patent: Mar. 1, 2016

(54) METHOD AND APPARATUS FOR TIME AND SPATIAL UTILIZATION OF A HIGH POWER BASE STATION CELL SPECTRUM BY A SMALL CELL

(71) Applicant: QUALCOMM Incorporated, San Diego, CA (US)

(72) Inventors: Damanjit Singh, San Diego, CA (US); Rajat Prakash, San Diego, CA (US); Farhad Meshkati, San Diego, CA (US); Chirag Sureshbhai Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 14/151,679

(22) Filed: Jan. 9, 2014

(65) Prior Publication Data

US 2015/0195066 A1 Jul. 9, 2015

(51) Int. Cl.
*H04L 5/00* (2006.01)
*H04W 52/24* (2009.01)
*H04W 88/08* (2009.01)

(52) U.S. Cl.
CPC ............. *H04L 5/0032* (2013.01); *H04L 5/001* (2013.01); *H04L 5/0023* (2013.01); *H04W 88/08* (2013.01)

(58) Field of Classification Search
CPC ..... H02M 7/217; H04L 5/001; H04L 5/0023; H04L 5/0032; H04W 52/245; H04W 88/08
See application file for complete search history.

(56) References Cited

U.S. PATENT DOCUMENTS

| 8,452,293 B2 | 5/2013 | Guvenc et al. |
| 2010/0216478 A1* | 8/2010 | Buddhikot et al. ........... 455/450 |
| 2012/0088517 A1 | 4/2012 | On et al. |
| 2012/0129522 A1 | 5/2012 | Kim et al. |
| 2012/0195210 A1 | 8/2012 | Grayson |
| 2013/0109395 A1 | 5/2013 | Szufarska et al. |

(Continued)

OTHER PUBLICATIONS

NTT Docomo et al: "Scenario and Migration for Small Cell Enhancement", 3GPP Draft; R1-130659 Operator Scenarios, 3$^{rd}$ Generation Partnership Project (3GPP), Mobile Competence Centre; 650, Route Des Lucioles; F-06921 Sophia-Antipolis Cedex; France, vol. RAN WG1, No. St Julian; 20130128-20130201 Jan. 19, 2013, XP050663908, Retrieved from the Internet; URL: http://www.3gpp.org/ftp/tsg_ran/WG1_RL1/TSGR1_72/Docs/ [retrieved on Jan. 19, 2013].

(Continued)

*Primary Examiner* — Kashif Siddiqui
(74) *Attorney, Agent, or Firm* — Arent Fox LLP

(57) ABSTRACT

Aspects of the methods and apparatus relate to exploiting the spectrum of a high power base station cell to provide higher capacity in a wireless communication system. Generally, a small cell with multi-carrier support may detect an absence of high power base station cell coverage or absence of high power base station cell users and may harness the high power base station cell carrier spectrum to provide higher data download rates and/or serve more mobility users. Specifically, aspects of the methods and apparatus include transmitting a first signal on a first carrier from a first access point and determining a current ability of a second access point on a second carrier. Thereafter, aspects of the methods and apparatus include transmitting a second signal on the second carrier from the first access point according to the determined current ability of the second access point.

28 Claims, 10 Drawing Sheets

(56) References Cited

U.S. PATENT DOCUMENTS

2013/0182655 A1 7/2013 Das et al.
2013/0189997 A1 7/2013 Urie

OTHER PUBLICATIONS

KDDI: "Views on Efficient Small Cell Operations", 3GPP Draft; R1-130208_KDDI_SCE_Operation, 3rd Generation Partnership-Project (3GPP), Mobile Competence Centre; 650, Route Des Lucioles; F-06921 Sophia-Antipolis Cedex; France, vol. RAN WG1, No. St Julian; 20130128-20130201 Jan. 18, 2013, XP050663369, Retrieved from the Internet: URL: http://www.3gpp.org/ftp/tsg_ran/WG1_RL1/TSGR1_72/Docs/ [retrieved on Jan. 18, 2013].
International Search Report dated Mar. 19, 2015 issued in International Patent Application No. PCT/US2014/072912. (12 total pages).
Park, "Small cell standardization in 3GPP Release 12," LG Ericsson, Oct. 18, 2012, 41 slides (pages).

* cited by examiner

METHOD AND APPARATUS FOR TIME AND SPATIAL UTILIZATION OF A HIGH POWER BASE STATION CELL SPECTRUM BY A SMALL CELL

BACKGROUND

Aspects of the present disclosure relate generally to wireless communication systems, and more particularly, to exploiting the spectrum of a high power base station cell to provide higher capacity in a wireless communication system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE), LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for farther improvements in LTE technology. Preferably, these improvements should be applicable to other multi-access technologies and the telecommunication standards that employ these technologies.

To supplement conventional, relatively high transmit power base stations, e.g., macro base stations or cells, additional restricted power or restricted coverage base stations, referred to as small cells or small coverage base stations or cells, can be deployed to provide more robust wireless coverage to mobile devices. For example, small cells including wireless relay stations and low power base stations (e.g., which can be commonly referred to as Home NodeBs or Home eNBs, collectively referred to as H(e)NBs, femto node, pico nodes, etc.) can be deployed for incremental capacity growth, richer user experience, in-building or other specific geographic coverage, and/or the like. Such low transmit power or small coverage (e.g., relative to the transmit power or coverage of macro network base stations or cells) cells or base stations can be connected to the Internet via broadband connection (e.g., subscriber line (DSL) router, cable or other modem, etc.), which can provide the backhaul link to the mobile operator's network. Thus, for example, the small coverage cells or base stations can be deployed in user homes or in buildings to provide mobile network access to one or more devices via the broadband connection.

Generally, high power base station or cell deployment along with small cell deployment is increasingly seen as a way to guarantee coverage in a given area, to provide services to high mobility users, and to provide other services to users when small cells are overloaded. However, in many locations or at many instances of time, situations that make it favorable for a high power base station cell to provide coverage and services to a user may not occur. As such, in those situations, the spectrum of the high power base station cell may not be optimally utilized, and therefore in these situations, there may be a need to better utilize the spectrum of the high power base station cell.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of wireless communication includes transmitting a first signal on a first carrier from a first access point. Additionally, the method includes determining a current ability of a second access point on a second carrier. Furthermore, the method includes transmitting a second signal on the second carrier from the first access point according to the determined current ability of the second access point.

In another aspect, an apparatus for wireless communication includes at least one processor and a memory coupled with the at least one processor, where the at least one processor is configured to transmit a first signal on a first carrier from a first access point. Additionally, the at least one processor is configured to determine a current ability of a second access point on a second carrier. Furthermore, the at least one processor is configured to transmit a second signal on the second carrier from the first access point according to the determined current ability of the second access point.

In another aspect, an apparatus for wireless communication includes means for transmitting a first signal on a first carrier from a first access point. Additionally, the apparatus includes means for determining a current ability of a second access point on a second carrier. Furthermore, the apparatus includes means for transmitting a second signal on the second carrier from the first access point according to the determined current ability of the second access point.

In yet another aspect, a non-transitory computer-readable media for wireless communication includes machine-executable code for causing a computer to transmit a first signal on a first carrier from a first access point. Additionally, the code may be executable for causing a computer to determine a current ability of a second access point on a second carrier. Furthermore, the code may be executable for causing a computer to transmit a second signal on the second carrier from the first access point according to the determined current ability of the second access point.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents. Furthermore, in the subject disclosure, the word "exemplary" is used to mean serving as an example, instance, or illustration. Any aspect or design described herein as "exemplary" is not necessarily to be construed as preferred or advantageous over other aspects or designs. Rather, use of the word exemplary is intended, to present concepts in a concrete fashion.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Furthermore, in the subject disclosure, the word "exemplary" is used to mean serving as an example, instance or illustration. Any aspect or design herein as "exemplary" is not necessarily to be construed as preferred or advantageous over other aspects or designs. Rather, use of the word exemplary is intended to present concepts in a concrete fashion.

Generally, a high power base station cell and a small base station cell may be allocated to operate in different spectrum. In situations where high power base station cell coverage is not available, the spectrum assigned to the high power base station cell may be wasted unused or sub-optimally used). Indeed, high power base station cell coverage and services may not be available to a user in certain situations. For example, a high power base station cell may not provide coverage in some indoor locations a basement of a building, offices inside a large complex, etc.) or in some outdoor locations (e.g., a house on a hilltop, a golf course, etc.). Therefore, at these locations of no or very limited high power base station cell coverage, the spectrum assigned or allocated to the high power base station cell may end up being wasted.

To remedy this issue, exemplary aspects of this disclosure utilize the multi-carrier ability of small cells to dynamically exploit the spectrum assigned to a high power base station cell. Specifically, a small cell having multi-carrier support may detect an absence of high power base station cell coverage or may detect that there is limited high power base station cell coverage. In either case, the small cell may harness the high power base station cell carrier spectrum that is otherwise not being optimally utilized to provide higher data download rates to its users and/or to serve more users.

Figure 1:
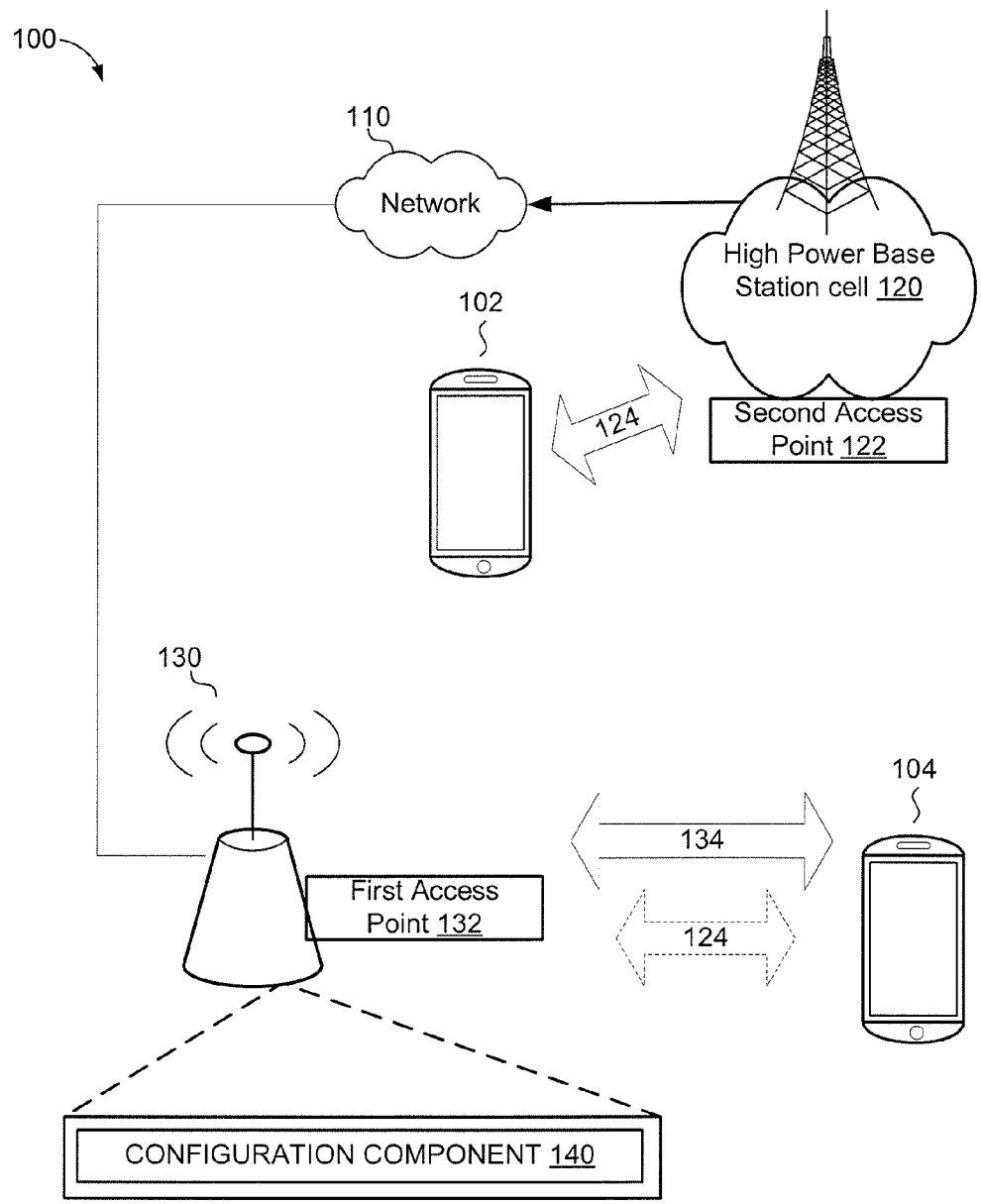
FIG. 1 is a schematic diagram illustrating exemplary aspects of exploiting the spectrum of a high power base station cell via a configuration component in a wireless communication system.

Referring to FIG. 1, in one aspect, a wireless communication system 100 is configured to facilitate transmitting data from one or more user equipments (UEs) (e.g., UE 102, UE 104) to a network 110. In an aspect, certain small cells, such as small cell 130, may be capable of multicarrier support and as such may be capable of utilizing multiple carriers. For example, multicarrier support may allow the small cell 130 to communicate with the UE 104 over two or more carriers at the same time. Within small cell 130 of wireless communication system 100 resides a configuration component 140 which may be configured to detect an absence of high power base station cell coverage of a high power base station cell 120 and/or to detect an absence of high power base station cell users present in the vicinity of small cell 130. The configuration component 140 may rely on these detection operations to determine when to utilize the high power base station cell spectrum 124 to facilitate communication with one or more UEs (e.g., UE 104). Specifically, in areas where high power base station cell 120 coverage is weak (e.g., inside of an apartment building or in the basement of a house), small cell 130 may be configured to detect the absence of high power base station cell 120 coverage and transmit data to UE 104 utilizing the high power base station cell spectrum 124 in addition to transmitting data to UE 104 on a small cell spectrum 134. That is, by having weak coverage of high power base station cell 120 near small cell 130, small cell 130 may utilize the otherwise unused or sub-optimally used high power base station cell spectrum 124. In an another aspect, in the areas where users (e.g., UE 102) of high power base station cell 120 are absent, small cell 130 may be configured to detect the absence such users and transmit data to its own users (e.g., UE 104) utilizing the high power base station cell spectrum 124 in addition to transmitting data on small cell spectrum 134.

The small cell 130 described in FIG. 1 may correspond to or may include, for example, a first access point 132, while high power base station cell 120 may correspond to or may include, for example, a second access point 122.

Figure 2:
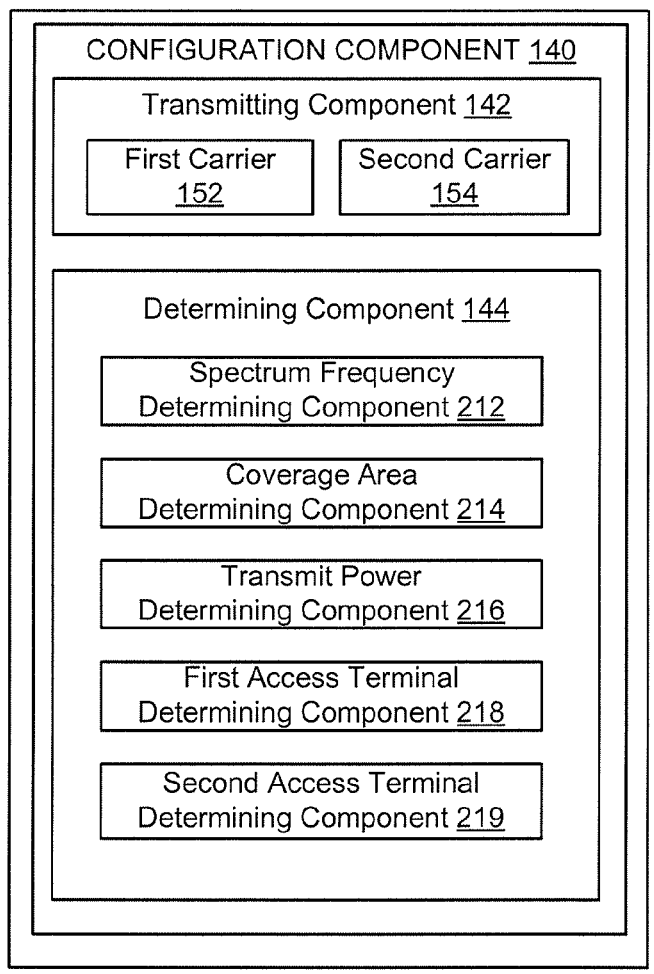
FIG. 2 is another schematic diagram illustrating exemplary aspects of exploiting the spectrum of a high power base station cell via a configuration component in a wireless communication system.

FIG. 2 describes in more detail the components of configuration component 140 of small cell 130 in wireless communication system 100. As discussed above, configuration component 140 may be configured to detect an absence of high power base station cell coverage of a high power base station cell 120 and, in response, utilize the high power base station cell spectrum 124 to facilitate communication with one or more UEs. In an aspect, configuration component 140 may be configured, among other things, to include transmitting component 142 capable of transmitting a first signal on a first carrier from a first access point. Transmitting component 142 may include a first carrier 152 and a second carrier 154, each of which is configured to utilize a different carrier for signal transmission. For example, with reference to FIG. 1, transmitting component 142 of small cell 130 is configured to transmit a first signal on first carrier 152 from first access point 132 to UE 104 over small cell spectrum 134.

Configuration component 140 may also be configured to include a determining component 144 capable of determining a current ability of a second access point on a second carrier. A current ability of the second access point on a second carrier may refer to a current use or support of the second carrier by the second access point. For example, with reference to FIG. 1, determining component 144 is configured to determine the current ability of second access point 122 on second carrier 154.

Determining the current ability of second access point 122 may include a spectrum frequency determining component 212 configured for determining the spectrum frequency of the second access point 122, which includes determining the frequency of high power base station cell spectrum 124. In one aspect, determining the frequency of high power base station cell spectrum 124 is based on radio measurements of the second access point performed by small cell 130. In another aspect, determining the frequency of high power base station cell spectrum 124 is based on radio measurements from the access terminals served by the small cell 130 (e.g., UE 104) and provided to small cell 130 by one or more of those access terminals.

The determining component 144 for determining the current ability of second access point 122 may also include a coverage area determining component 214 configured for determining a coverage area of second access point 122. The determining component 214 may be configured for determining the coverage area of second access point 122 by, for example, determining the coverage area of high power base station cell 120. Determining a coverage area of high power base station cell 120 may be based on radio measurements performed by first access point 132, measurements received from access terminals (such as UE 104) connected to first access point 132 associated with small cell 130, cell reselections of the access terminal of UE 102 on the second carrier 154, connection failures of the access terminal of UE 102 on second carrier 154, and/or handover requests of the access terminal of UE 102 on second carrier 154.

The determining component 144 for determining the current ability of second access point 122 may also include a transmit power determining component 216 configured for determining a transmit power (e.g., signal strength) of second access point 122. This can be achieved, for example, by reading broadcast channel of second access point 122. In one example, transmit power information of second access point 122 may be present in one of the System Information Blocks (SIBs) received at first access point 132 of small cell 130. The transmit power information present in one of SIBs received at first access point 132 may then be used to determine the transmit power of second access point 122.

Moreover, the determining component 144 for determining the current ability of second access point 122 may also include first access terminal determining component 218 configured for determining a presence of a first access terminal, such as access terminal UE 104, on first carrier 152. In one aspect, determining the presence of an access terminal on first carrier 152 may be based on a radio connection radio link) between the first access point 132 and the access terminal UE 104.

Moreover, the determining component 141 for determining the current ability of second access point 122 may also include second access determining component 219 configured for determining the presence of a second access terminal, such as access terminal for UE 102, on second carrier 154. Determining the presence of an access terminal on second carrier 154 may be based on uplink radio measurements performed by first access point 132, measurements received from access terminals (such as UE 104) connected to first access point 132 associated with small cell 130, cell reselections of second carrier 154 performed by UE 102, connection failures of the access terminals (e.g., UE 102) on second carrier 154, and/or handover requests of the access terminals (e.g., UE 102) on second carrier 154.

In another aspect, after determining the ability of second access point 122, transmitting component 142, residing in configuration component 140, may also be capable of transmitting a second signal on the second carrier from the first access point according to the determined current ability of the second access point. For example, with reference to FIG. 1, transmitting component 142 is configured to transmit a second signal on second carrier 154 from first access point 132 to UE 104 over high power base station cell spectrum 121 according to the determined current ability of second access point 122.

The transmission of a signal on second carrier 154 to UE 104 may be according to or based on the determined frequency of high power base station cell spectrum 124, the determined coverage area of high power base station cell 120, the determined transmit power of the high power base station cell 120, the presence of a first access terminal, and/or the presence of a second access terminal.

It should be noted that the transmission power of small cell 130 when transmitting on second carrier 154 may be different than the transmission power of small cell 130 when transmitting on first carrier 152. For example, power adaption on second carrier 154 may be accomplished based on co-channel adaption techniques, such as, identifying the radio link failures (RLFs), identifying the handovers, etc., which may be caused by small cell 130 transmission on the second carrier 154. In other words, transmitting a signal on second carrier 154 may include changing or adjusting the power of the transmitted signal on second carrier 154 based on the transmit power associated with second access point 122 of high power base station cell 120.

Additionally, the transmission of a signal on second carrier 154 to UE 104 may be according to or based on the access terminal (such as UE 104) measurement reports of second carrier 154, the access terminal reports of first carrier 152, history of cell reselections of other UEs (such as but not limited to UE 102) on second carrier 154, handover requests of other UEs on second carrier 154, handover failures of other UEs on second carrier 154, and/or the number of handovers of the other UEs on second carrier 154.

In an implementation aspect, while small cell 130 is communicating with UE 104 over first carrier 152 on small cell spectrum 134 and on high power base station cell spectrum 124, small cell 130 may determine that it is no longer receiving hand-in requests from high power base station cell 120 from UE 102 over second carrier 154 on high power base station cell spectrum 124 and/or is no longer receiving handover failure reports from other UEs served by high power base station cell 120 within small cell coverage area of small cell 130. Small cell 130 may, from either or both of these determinations, identify that the mobility of access terminals served by high power base station cell 120 such as UE 102 on high power base station cell spectrum 124 in the small cell coverage area of small cell 130 is low (e.g., the ability of UE 102 to move to another location) and hence, may decide to either maintain or increase its transmit power on high power base station cell spectrum 124 when the mobility is low.

In an another implementation aspect, small cell 130 may ascertain or determine that high power base station cell 120 coverage is limited and/or the impact on high power base station cell 120 users may be limited if small cell 130 uses high power base station cell spectrum 124. At this point, small cell 130 may attempt to determine the current abilities of second access point 122 of high power base station cell 120. As noted above, these abilities may include determining frequency of high power base station cell spectrum 124, determining a coverage area of high power base station cell 120, determining transmit power of the second access point, etc. After determining the abilities of second access point 122, small cell 130 may attempt to connect to UE 104 over high power base station cell spectrum 124 based on the determined abilities of second access point 122.

In addition to utilizing high power base station cell spectrum 124 when high power base station cell coverage of high power base station cell 120 is limited, small cell 130 may utilize high power base station cell spectrum 124 when there are no high power base station cell 120 users in the vicinity of a small cell 130 coverage area at a given time. Again, at these instances, spectrum assigned to high power base station cell 120 may be wasted, unused, or sub-optimally used in the region near small cell 130. For example, when there are no users of high power base station cell 120, small cell 130 may utilize high power base station cell spectrum 124 to connect to UE 104 over second carrier 154. This implementation may also be employed when multiple indoor UEs or low speed outdoor UEs are on a small cell spectrum 134, hence overloading small cell spectrum 134.

Indeed, once small cell 130 determines that small cell spectrum 134 has become over loaded or that high power base station cell spectrum 124 is not being utilized in the coverage area of small cell 130, small cell 130 may determine the current abilities of second access point 122 of high power base station cell 120. After determining the abilities of second access point 122, small cell 130 may attempt to connect to UE 104 over high power base station cell spectrum 124 based on the determined abilities of second access point 122.

As such, small cell 130 may be able to utilize high power base station cell spectrum 124 to provide higher data rates to UE 104 than when only using the small cell spectrum 134, and/or serve more UEs in the coverage area of small cell 130. Since the utilization of high power base station cell spectrum 124 may be dependent on the presence of high power base station cell 120 users or their mobility level or pattern, exploitation of high power base station cell spectrum 124 by small cell 130 could be more dynamic or time-varying.

The dynamism or adjustment of the spectrum used by small cell 130 may be dependent on the small cell 130 location within the high power base station cell 120 coverage area. For instance, when small cell 130 is located where it is known that high power base station cell coverage is limited, small cell 130 may constantly communicate with UE 104 over both small cell spectrum 134 and high power base station cell spectrum 124. In another example, when all the UEs in a high power base station cell coverage area have low mobility (e.g., the UEs are either present or absent for long durations), small cell 130 may not be constantly determining current abilities of second access point to determine utilization of high power base station cell spectrum 124. In both of these cases, the requirements of small cell 130 call for less dynamic use of high power base station cell spectrum 124.

However in some case, the requirements of small cell 130 located within the high power base station cell 120 coverage area may call for more dynamism to utilize high power base station cell spectrum 124. For example, if small cell 130 detects that there are a number of high mobility users present on the high power base station cell spectrum 124 (e.g., where users are constantly moving around between multiple high power base station cell coverage areas), then small cell 130 may choose to continuously monitor current abilities of second access point to determine utilization of high power base station cell spectrum 124 and therefore, use it only when high mobility users are not present.

In some cases, small cell 130 may examine the abilities of high power base station cell spectrum 124 over a period of time for the absence of high mobility users by communicating with UEs using high power base station cell spectrum 124. For example, small cell 130 may transmit on high power base station cell spectrum 124 until a certain number of radio link failures or handovers are observed.

A small cell (e.g., small cell 130) may examine the abilities of high power base station cell 120 through enhanced inter-cell interference coordination (eICIC) technique. The eICIC technique may be used for keeping the inter-cell interferences under control by radio resource management (RRM) methods. Generally, the eICIC technique may be used to determine the resources (e.g., bandwidth and power) available at each cell at any time. Once small cell 130 determines the abilities of high power base station cell spectrum 124 based on the eICIC technique or scheme, small cell 130 may then communicate with UE 104 over high power base station cell spectrum 124.

In another aspect, small cell 130 may minimize the interference and mobility impacts on high power base station cell UEs by minimizing the time small cell 130 transmits on high power base station cell spectrum 124. For example, small cell 130 may detect the presence of active connected modes users on small cell spectrum 134 and may use high power base station cell spectrum 124 only during the time when active users are present on small cell spectrum 134, thereby providing small cell users with higher data rates.

Figure 3:
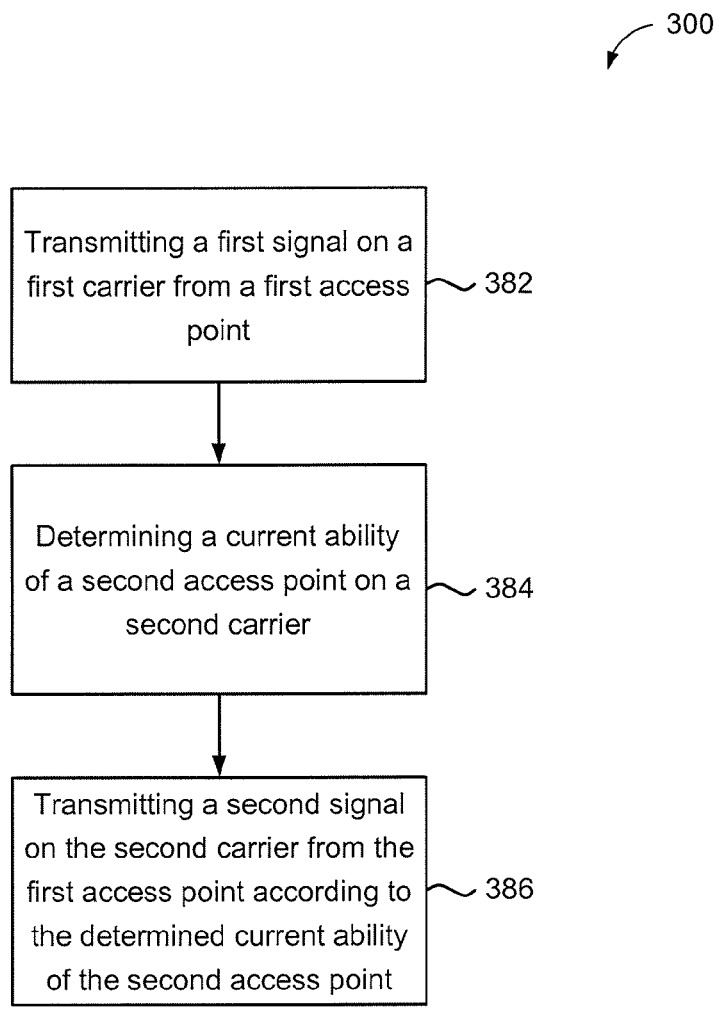
FIG. 3 is a flowchart of an aspect of a method of wireless communication according to FIG. 1 and FIG. 2.

Referring to FIG. 3, in operation, a small cell, such as small cell 130 (FIG. 1), may perform one aspect of a method 300 for improved utilization of a high power base station cell spectrum. While, for purposes of simplicity of explanation, the methods herein are shown and described as a series of acts, it is to be understood and appreciated that the methods are not limited by the order of acts, as some acts may, in accordance with one or more aspects, occur in different orders and/or concurrently with other acts from that shown and described herein. For example, it is to be appreciated that the methods could alternatively be represented as a series of interrelated states or events, such as in a state diagram. Moreover, not all illustrated acts may be required to implement a method in accordance with one or more features described herein.

In an aspect, at block 382, method 300 may transmit a first signal on a first carrier from a first access point. For example, as described herein with reference to FIGS. 1, 2, transmitting component 142 of small cell 130 is configured to transmit a first signal on first carrier 152 from first access point 132 to UE 104 over small cell spectrum 134.

In a further aspect, at block 384, method 300 may determine a current ability of a second access point on a second carrier. For example, after transmitting component 142 transmits a first signal on first carrier 152 from first access point 132 to UE 104, determining component 144 is configured to determine the current ability of second access point 122 on second carrier 154 through radio measurements or access terminal reports of high power base station cell 120.

In a farther aspect, at block 386, method 300 may transmit a second signal on the second carrier from the first access point according to the determined current ability of the second access point. For example, after determining component 144 determines the current ability of second access point 122 on second carrier 154, transmitting component 142 is configured to transmit a second signal on second carrier 154 from first access point 132 to UE 104 over high power base station cell spectrum 124 according to the determined current ability of second access point 122.

Figure 4:
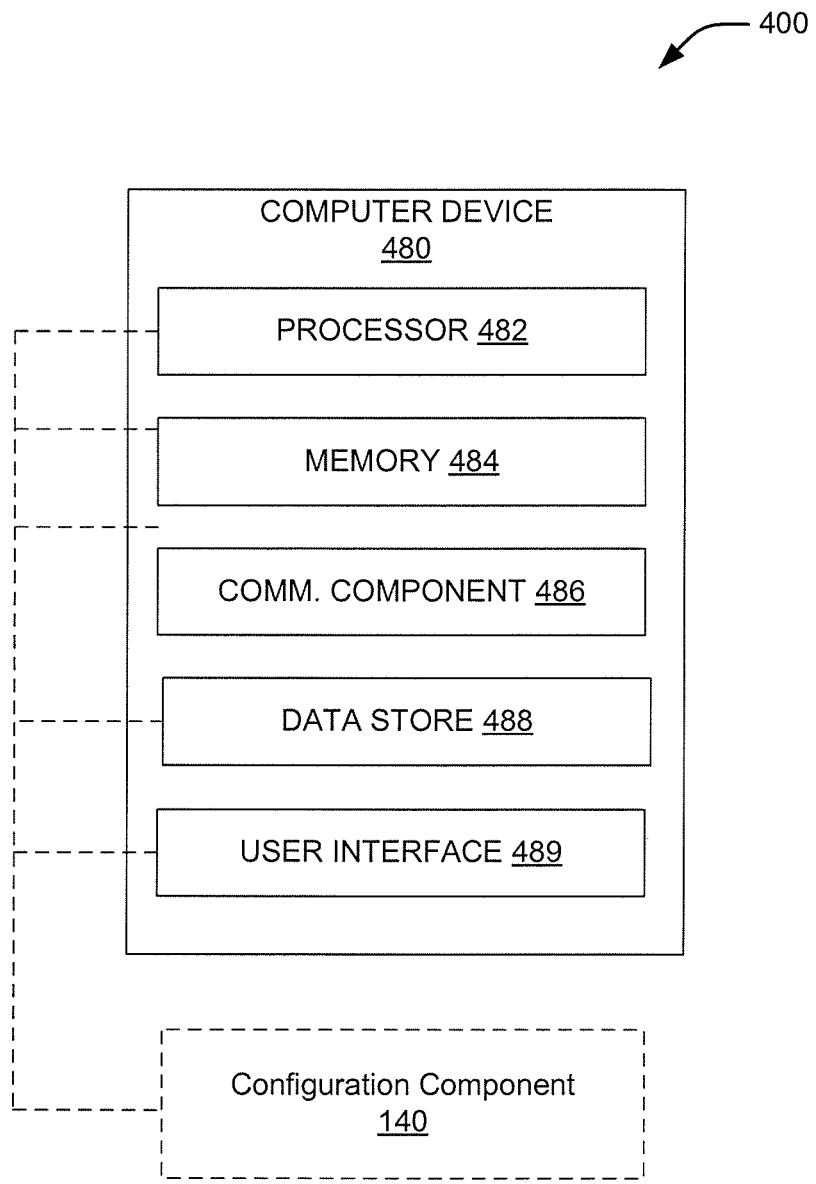
FIG. 4 is a block diagram illustrating additional example components of an aspect of a computer device including a configuration component according to the present disclosure.

Referring to the computer system 400 of FIG. 4, in one aspect, small cell 130 may be represented by a specially programmed or configured computer device 480, wherein the special programming or configuration includes configuration component 140 (FIGS. 1, 2), as described herein. For example, for implementation as small cell 130 (FIG. 1), computer device 480 may include one or more components for computing and transmitting a data from a small cell 130 to UE 104, such as in specially programmed computer readable instructions or code, firmware, hardware, or some combination thereof. Computer device 480 may include a processor 482 for carrying out processing functions associated with one or more of components and functions described herein. Processor 482 can include a single or multiple set of processors or multi-core processors. Moreover, processor 482 can be implemented as an integrated processing system and/or a distributed processing system.

Computer device 480 may further includes a memory 484, such as for storing data used herein and/or local versions of applications being executed by processor 482. Memory 484 can include any type of memory usable by a computer, such as random access memory (RAM), read only memory (ROM), tapes, magnetic discs, optical discs, volatile memory, non-volatile memory, and any combination thereof.

Further, computer device 480 may include a communications component 486 that provides for establishing and maintaining communications with one or more parties utilizing hardware, software, and services as described herein. Communications component 186 may carry communications between components on computer device 480, as well as between computer device 480 and external devices, such as devices located across a communications network and/or devices serially or locally connected to computer device 480. For example, communications component 486 may include one or more buses, and may further include transmit chain components and receive chain components associated with a transmitter and receiver, respectively, or a transceiver, operable for interfacing with external devices. For example, in an aspect, a receiver of communications component 486 operates to receive one or more data, which may be a part of memory 484.

Additionally, computer device 480 may further include a data store 488, which can be any suitable combination of hardware and/or software, that provides for mass storage of information, databases, and programs employed in connection with aspects described herein. For example, data store 488 may be a data repository for applications not currently being executed by processor 482.

Computer device 480 may additionally include a user interface component 489 operable to receive inputs from a user of computer device 480, and further operable to generate outputs for presentation to the user. User interface component 489 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 489 may include one or more output devices, including but not limited, to a display, a speaker, a haptic feedback mechanism, a printer, any other mechanism capable of presenting an output to a user, or any combination thereof.

Furthermore, computer device 480 may include, or may be in communication with, configuration component 140 (FIGS. 1, 2), which may be configured to perform the functions described herein.

Figure 5:
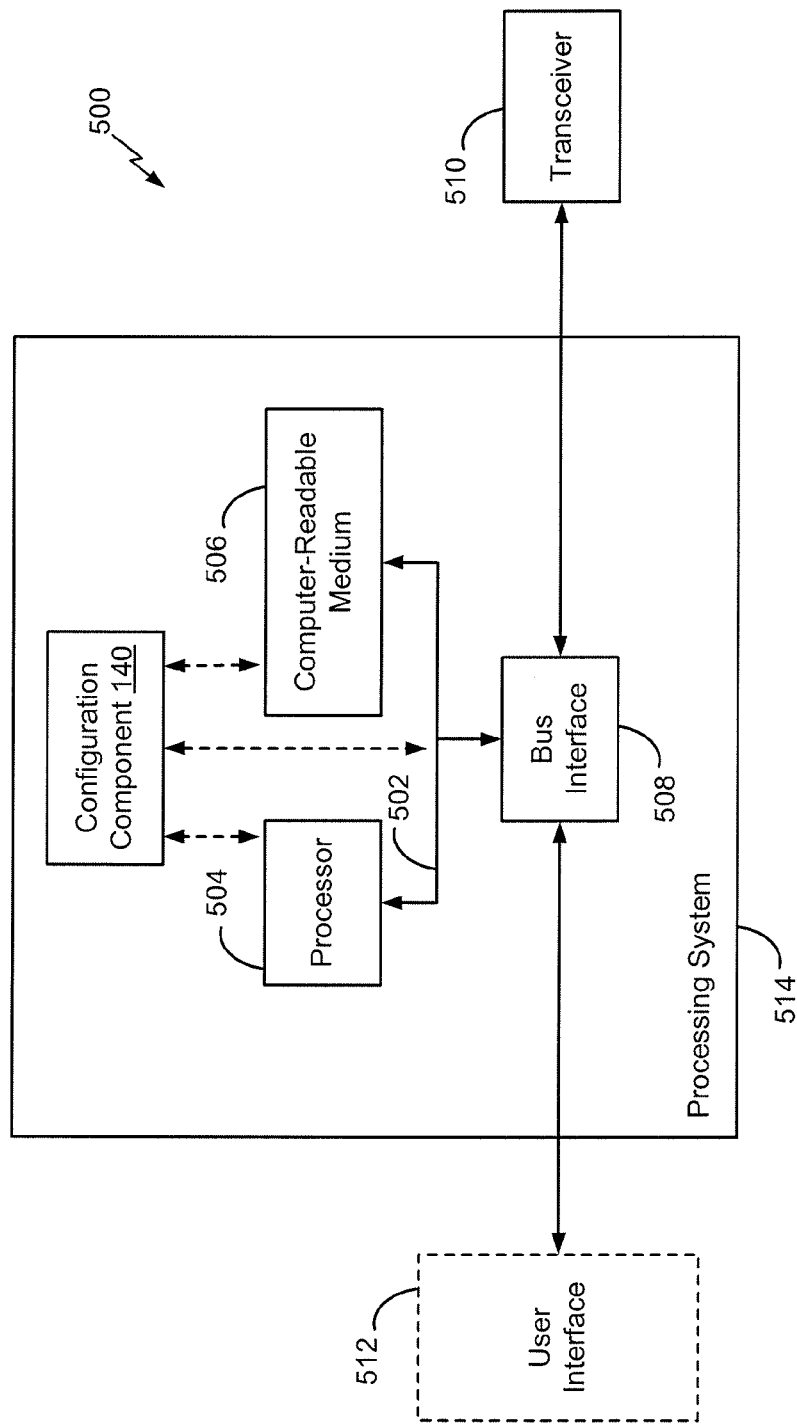
FIG. 5 is a block diagram illustrating an example of a hardware implementation for an apparatus employing a processing system executing a configuration component to perform the functions described herein.

FIG. 5 is a block diagram illustrating an example of a hardware implementation for an apparatus 500 employing a processing system 514. Apparatus 500 may be configured to include, for example, configuration component 140 (FIGS. 1, 2) implementing the components described above, such as transmitting component 142 and determining component 144. In this example, the processing system 514 may be implemented with a bus architecture, represented generally by the bus 502. The bus 502 may include any number of interconnecting buses and bridges depending on the specific application of the processing system 514 and the overall design constraints. The bus 502 links together various circuits including one or more processors, represented generally by the processor 504, and computer-readable media, represented generally by the computer-readable medium 506. The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a means fir communicating with various other apparatus over a transmission medium. Depending upon the nature of the apparatus, a user interface 56 keypad, display, speaker, microphone, joystick) may also be provided.

The processor 504 is responsible for managing the bus 502 and general processing, including the execution of software stored on the computer-readable medium 506. The software, when executed by the processor 504, causes the processing system 514 to perform the various functions described infra for any particular apparatus. The computer-readable medium 506 may also be used for storing data that is manipulated by the processor 504 when executing software.

In an aspect, processor 504, computer-readable medium 506, or a combination of both may be configured or otherwise specially programmed to perform the at least some of the functionality of configuration component 140 (FIGS. 1, 2) as described herein.

The various concepts presented throughout this disclosure may be implemented across a broad variety of telecommunication systems, network architectures, and communication standards.

Figure 6:
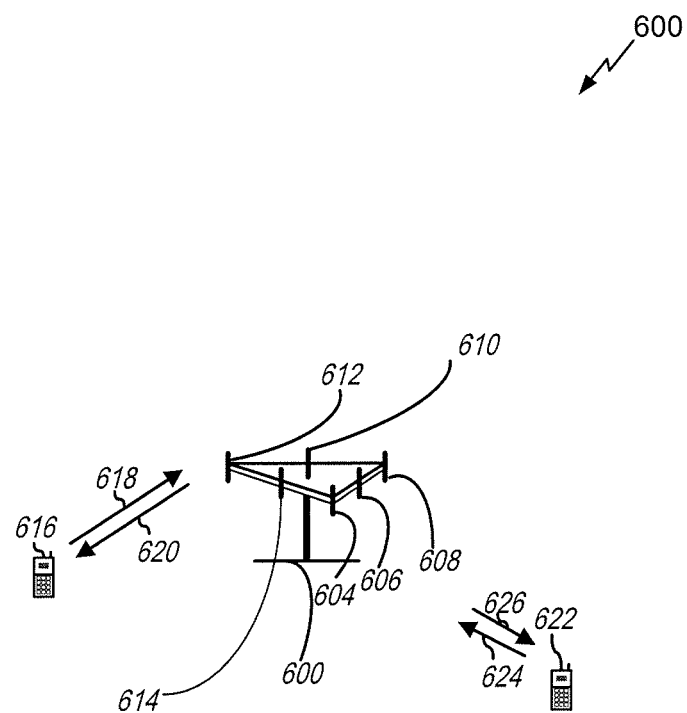
FIG. 6 is a schematic diagram illustrating a multiple access wireless communication system including an aspect of the network entity described, e.g., according to FIG. 1.

Referring to FIG. 6, a multiple access wireless communication system 600 according to one aspect is illustrated. An access point 600 (AP) includes multiple antenna groups, one including 604 and 606, another including 608 and 610, and an additional including 612 and 614. Further, in some aspects, AP 600 may be the same or similar as small cell 130 including configuration component 140 (FIGS. 1, 2). In FIG. 6, only two antennas are shown for each antenna group, however, more or fewer antennas may be utilized for each antenna group. Access terminal 616 (AT), which may be the same as or similar to UEs 102 (FIG. 1), is in communication with antennas 612 and 614, where antennas 612 and 614 transmit information to access terminal 616 over forward link 620 and receive information from access terminal 616 over reverse link 618. Access terminal 622, which may be the same as or similar to UE 104 (FIG. 1), is in communication with antennas 606 and 608, where antennas 606 and 608 transmit information to access terminal 622 over forward link 626 and receive information from access terminal 622 over reverse link 624, in a FDD system, communication links 618, 620, 624 and 626 may use different frequency for communication. For example, forward link 620 may use a different frequency then that used by reverse link 618.

Each group of antennas and/or the area in which they are designed to communicate is often referred to as a sector of the access point. In the aspect, antenna groups each are designed to communicate to access terminals in a sector, of the areas covered by access point 600.

In communication over forward links 620 and 626, the transmitting antennas of access point 600 utilize beamforming in order to improve the signal-to-noise ratio of forward links for the different access terminals 616 and 624. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and also may be referred to as an access point, a Node B, an evolved Node B (eNB), or some other terminology. An access terminal may also be called an access terminal, user equipment (UE), a wireless communication device, terminal, access terminal or some other terminology.

Figure 7:
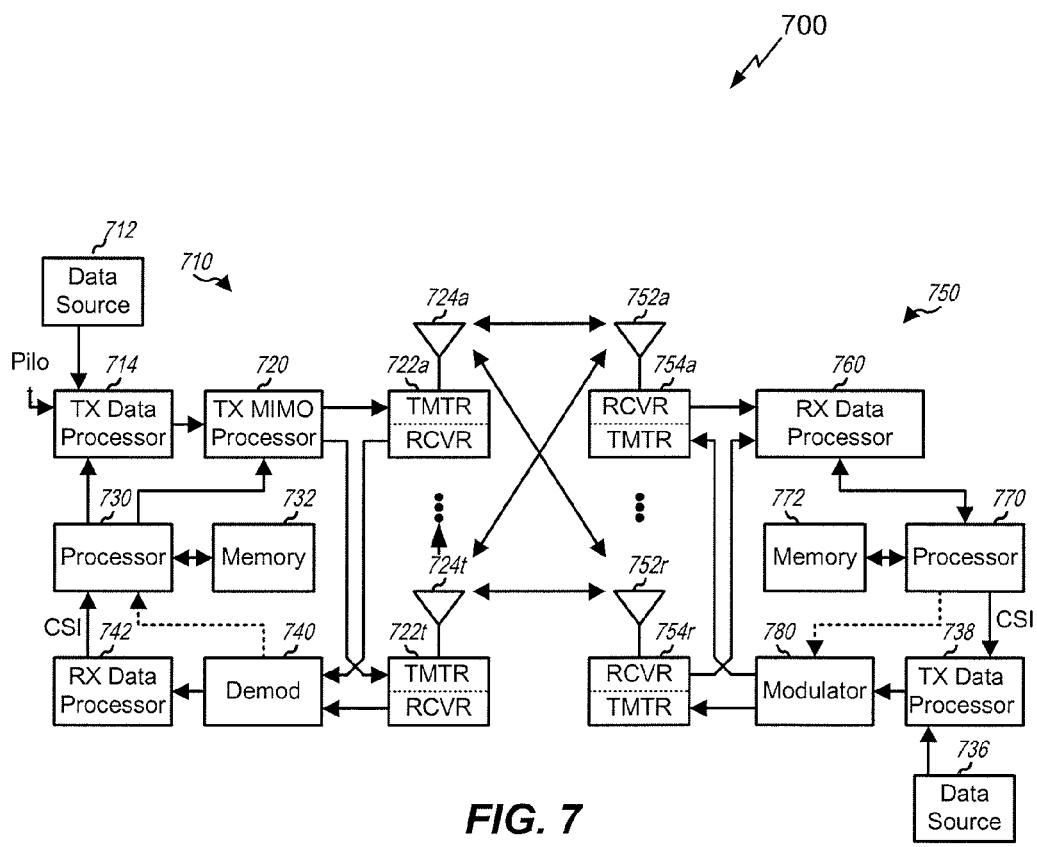
FIG. 7 illustrates a block diagram of a communication system including an aspect of the user equipment described herein.

FIG. 7 is a block diagram of an aspect of a transmitter system 710 (also known as the access point) and a receiver system 750 (also known as access terminal) in a Multiple-Input Multiple-Output (MIMO) system 700. In other aspects, transmitter system 710 may be the same as or similar to small cell 130 that includes configuration component 140 (FIGS. 1, 2). Further, in other aspects, receiver system 750 may be the same as or similar to UEs 102 and 104 (FIG. 1). At the transmitter system 710, traffic data for a number of data streams is provided from a data source 712 to a transmit (TX) data processor 714.

In an aspect, each data stream is transmitted over a respective transmit antenna. TX data processor 714 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 730.

The modulation symbols for all data streams are then provided to a TX MIMO processor 720, which may further process the modulation symbols (e.g., for OFDM). TX MIMO processor 720 then provides $N_T$ modulation symbol streams to $N_T$ transmitters (TMTR) 726a through 726t. In certain aspects, TX MIMO processor 720 applies beamforming weights to the symbols of the data streams and to the antenna from which the symbol is being transmitted.

Each transmitter 726 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 726a through 726t are then transmitted from $N_T$ antennas 724a through 724t, respectively.

At receiver system 750, the transmitted modulated signals are received by $N_R$ antennas 752a through 752r and the received signal from each antenna 752 is provided to a respective receiver (RCVR) 754a through 754r. Each receiver 754 conditions (e.g., filters, amplifies, and downconverts) a respective received signal, digitizes the conditioned signal to provide samples, and further processes the samples to provide a corresponding "received" symbol stream.

An RX data processor 760 then receives and processes the $N_R$ received symbol streams from $N_R$ receivers 754 based on a particular receiver processing technique to provide $N_T$ "detected" symbol streams. The RX data processor 760 then demodulates, deinterleaves, and decodes each detected symbol stream to recover the traffic data for the data stream. The processing by RX data processor 760 is complementary to that performed by TX MIMO processor 720 and TX data processor 714 at transmitter system 710.

A processor 770 periodically determines which pre-coding matrix to use (discussed below). Processor 770 formulates a reverse link message comprising a matrix index portion and a rank value portion.

The reverse link message may comprise various types of information regarding the communication link and/or the received data stream. The reverse link message is then processed by a TX data processor 738, which also receives traffic data for a number of data streams from a data source 736, modulated by a modulator 780, conditioned by transmitters 754a through 754r, and transmitted back to transmitter system 710.

At transmitter system 710, the modulated signals from receiver system 750 are received by antennas 724, conditioned by receivers 726, demodulated by a demodulator 740, and processed by a RX data processor 742 to extract the reserve link message transmitted by the receiver system 750. Processor 730 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PITY channels. The PITY channels comprise a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

Figure 8:
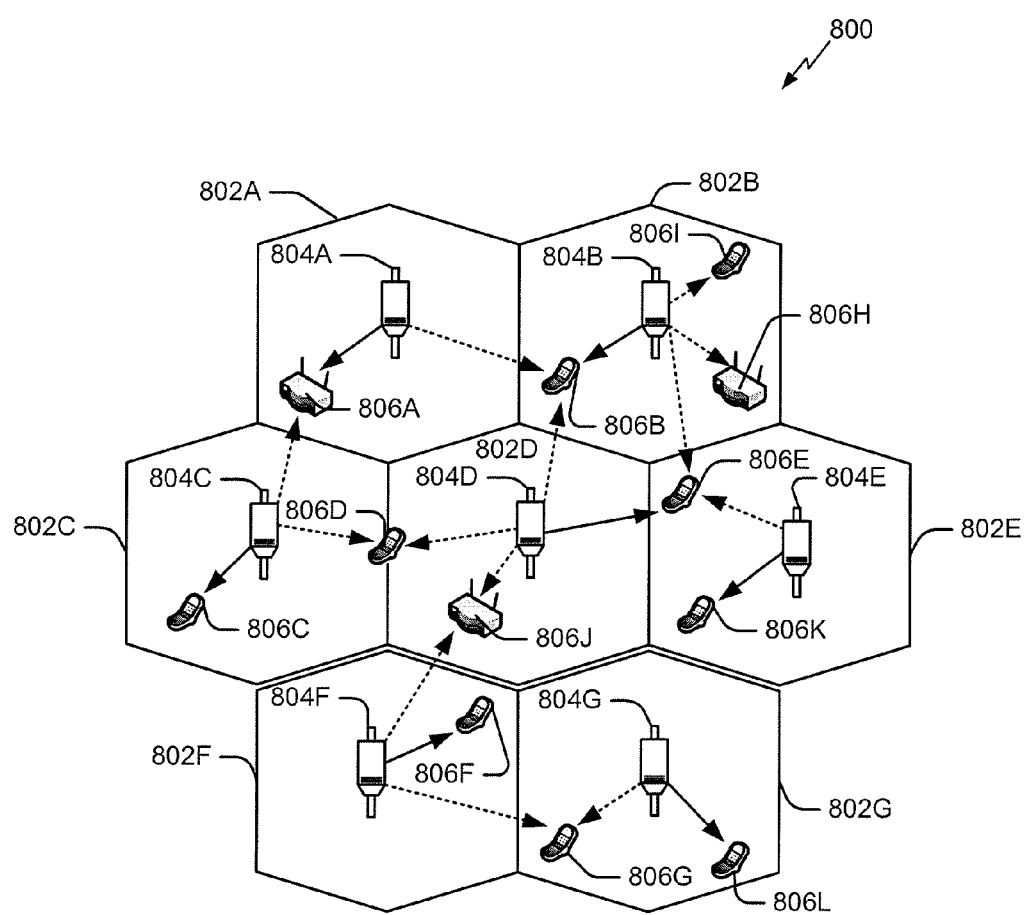
FIG. 8 is a schematic diagram illustrating a wireless communication system, configured to support a number of users, in which the aspects related to the user equipment described herein may be implemented.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C—Control—
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCH MBMS point-to-multipoint Control CHannel
MRW Move Receiving Window
MSB Most Significant Bit
MSCH MBMS point-to-multipoint Scheduling CHannel
MICH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U—User—
UE User Equipment
DL UpLink
UM Unacknowledged Mode
UMD Unacknowledged Mode Data
UMTS Universal Mobile Telecommunications System
UTRA UNITS Terrestrial Radio Access
UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel FIG. 8 illustrates a wireless communication system 800, configured to support a number of users, in which the teachings herein may be implemented. The system 800 provides communication for multiple cells 802, such as, for example, macro cells 802A-802G, with each cell being serviced by a corresponding access node 804 (e.g., access Bodes 804A-804G). In some aspects, macro cells 802A-802G may be the same as or similar to small cell 130 that includes configuration component 140 (FIGS. 1, 2). Further, in other aspects, each access node 804 may be the same as or similar to small cell 130 that includes configuration component 140 (FIGS. 1, 2). As shown in FIG. 8, access terminals 806 (e.g., access terminals 806B-806L) may be dispersed at various locations throughout the system over time, wherein each access terminal 806 may be the same as or similar to UEs 102 and 104 (FIG. 1). Each access terminal 806 may communicate with one or more access nodes 804 on a forward link ("FL") and/or a reverse link ("RL") at a given moment, depending upon whether the access terminal 806 is active and whether it is in soft handoff, for example. The wireless communication system 800 may provide service over a large geographic region. For example, macro cells 802A-802G may cover a few blocks in a neighborhood.

Figure 9:
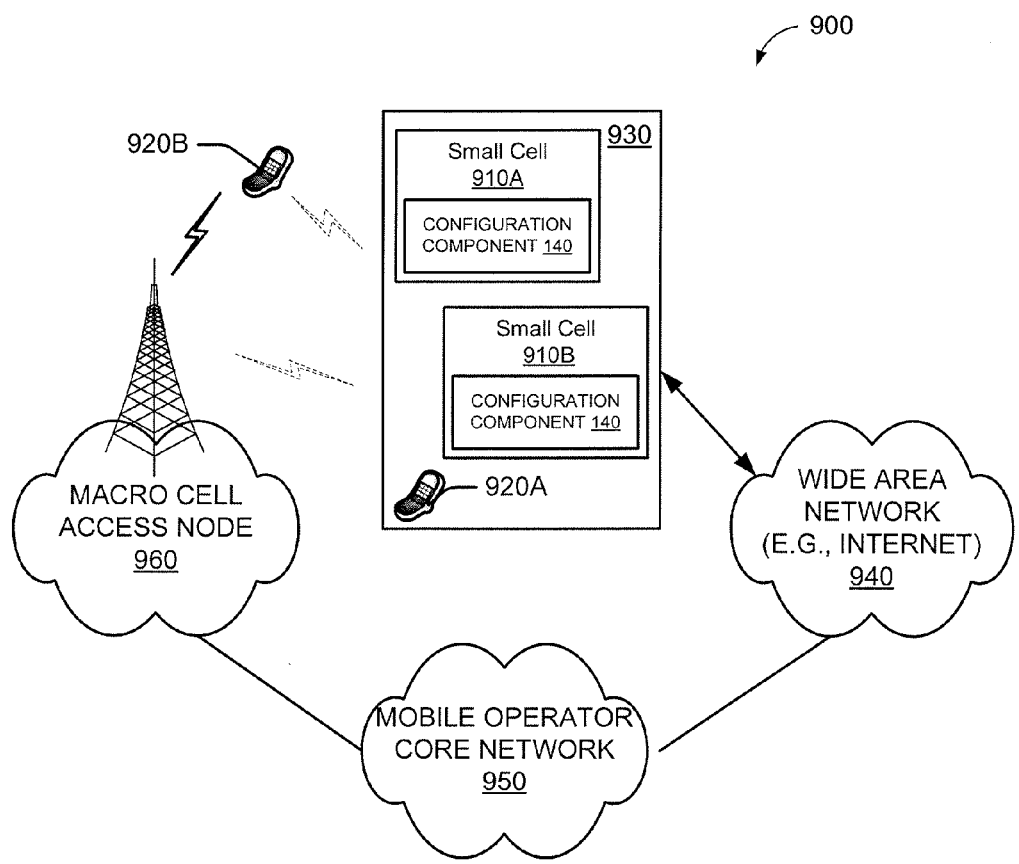
FIG. 9 is a schematic diagram that illustrates an aspect of a communication system including small cells within a network environment.

FIG. 9 illustrates an exemplary communication system 900 where one or more small cells are deployed within a network environment. Specifically, the system 900 includes multiple small cells 910 small cells or HNB 910A and 910B) installed in a relatively small scale network environment (e.g., in one or more user residences 930), wherein the small cells 910 may be the same as or similar to network entity 12 including configuration component 140 (FIGS. 1, 2). Each small cell 910 may include a configuration component 140 (FIG. 1) may be coupled to a wide area network 940 (e.g., the Internet) and a mobile operator core network 950 via a DSL router, a cable modem, a wireless link, or other connectivity means (not shown). As will be discussed below, each small cell 910 may be configured to serve associated access terminals 920 access terminal 920A) and, optionally, alien access terminals 920 (e.g., access terminal 920B), both of which may be the same as or similar to UEs 102 and 104 (FIG. 1). In other words, access to small cells 910 may be restricted whereby a given access terminal 920 may be served by a set of designated (e.g., home) small cell(s) 910 but may not be served by any non-designated small cells 910 (e.g., a neighbor's small cell 910).

Figure 10:
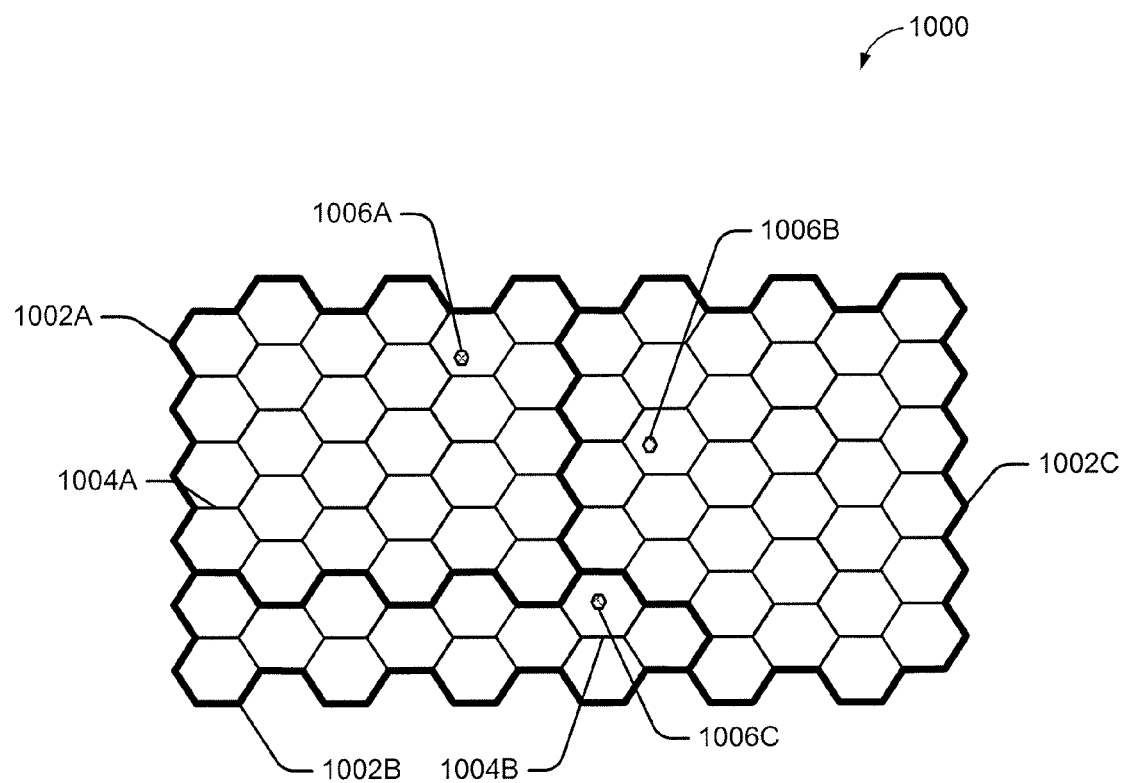
FIG. 10 illustrates an example of a coverage map where several tracking areas are defined, some of which may be provided by the user equipment described herein.

FIG. 10 illustrates an example of a coverage map 1000 where several tracking areas 1002 (or routing areas or location areas) are defined, each of which includes several macro coverage areas 1004. Here, areas of coverage associated with tracking areas 1002A, 1002B, and 1002C are delineated by the wide lines and the macro coverage areas 1004 are represented by the hexagons. The tracking areas 1002 also include small cell coverage areas 1006, which may be provided by small cell 130 that includes configuration component 140 (FIGS. 1, 2). In this example, each of the small cell coverage areas 1006 (e.g., small cell coverage area 1006C) is depicted within a macro coverage area 1004 (e.g., macro coverage area 1004B). It should be appreciated, however, that a small cell coverage area 1006 may not lie entirely within a macro coverage area 1004. In practice, a large number of small cell coverage areas 1006 may be defined with a given tracking area 1002 or macro coverage area 1004. Also, one or more pico coverage areas (not shown) may be defined within a given tracking area 1002 or macro coverage area 1004.

Referring again to FIG. 9, the owner of a small cell 910 may subscribe to mobile service, such as, for example, 3G mobile service (e.g., UEs 102 and 104 of FIG. 1), offered through the mobile operator core network 950. In addition, an access terminal 920 may be capable of operating both in macro environments and in smaller scale (e.g., residential) network environments. In other words, depending on the current location of the access terminal 920, the access terminal 920 may be served by an access node 960 of the macro cell mobile network 950 or by any one of a set of small cells 910 (e.g., the small cells 910A and 910B that reside within a corresponding user residence 930). For example, when a subscriber is outside his home, he is served by a standard macro access node (e.g., node 960) and when the subscriber is at home, he is served by a small cell (e.g., node 910A). Here, it should be appreciated that a small cell 920 may be backward compatible with existing access terminals 920.

A small cell 910 may be deployed on a single frequency or, in the alternative, on multiple frequencies. Depending on the particular configuration, the single frequency or one or more of the multiple frequencies may overlap with one or more frequencies used by a macro node (e.g., node 960). In some aspects, an access terminal 920 may be configured to connect to a preferred small cell (e.g., the home small cell of the access terminal 920) whenever such connectivity is possible. For example. Whenever the access terminal 920 is within the user's residence 930, it may be desired that the access terminal 920 communicate only with the home small cell 910.

In some aspects, if the access terminal 920 operates within the macro cellular network 950 but is not residing on its most preferred network (e.g., as defined in a preferred roaming list), the access terminal 920 may continue to search for the most preferred network (e.g., the preferred small cell 910) using a Better System Reselection ("BSR"), which may involve a periodic scanning of available systems to determine whether better systems are currently available, and subsequent efforts to associate with such preferred systems. With the acquisition entry, the access terminal 920 may limit the search for specific band and channel. For example, the search for the most preferred system may be repeated periodically.

Upon discovery of a preferred small cell 910, the access terminal 920 selects the small cell 910 for camping within its coverage area.

A small cell may be restricted, in some aspects. For example, a given small cell may only provide certain services to certain access terminals. In deployments with so-called restricted (or closed) association, a given access terminal may only be served by the macro cell mobile network and a defined set of small cells the small cells 910 that reside within the corresponding user residence 930). In some implementations, a node may be restricted to not provide, for at least one node, at least one of: signaling, data access, registration, paging, or service.

In some aspects, a restricted small cell (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access nodes (e.g., small cells) that share a common access control list of access terminals. A channel on which all small cells (or all restricted small cells) in a region operate may be referred to as a small cell channel.

Various relationships may thus exist between a given small cell and a given access terminal. For example, from the perspective of an access terminal, an open small cell may refer to a small cell with no restricted association. A restricted small cell may refer to a small cell that is restricted in some manner (e.g., restricted for association and/or registration). A home small cell may refer to a small cell on which the access terminal is authorized to access and operate on. A guest small cell may refer to a small cell on which an access terminal is temporarily authorized to access or operate on. An alien small cell may refer to a small cell on which the access terminal is not authorized to access or operate on, except for perhaps emergency situations (e.g., 911 calls).

From a restricted small cell perspective, a home access terminal may refer to an access terminal that authorized to access the restricted small cell. A guest access terminal may refer to an access terminal with temporary access to the restricted small cell. An alien access terminal may refer to an access terminal that does not have permission to access the restricted small cell, except for perhaps emergency situations, for example, such as 911 calls (e.g., an access terminal that does not have the credentials or permission to register with the restricted small cell).

For convenience, the disclosure herein describes various functionality in the context of a small cell. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established, via a single-in-single-out system, a multiple-in-multiple-out ("MIMO") system, or some other type of system.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand, that information and, signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
   transmitting a first signal on a first carrier from a first access point;
   determining, by the first access point, a current ability of a second access point on a second carrier; and
   transmitting a second signal on the second carrier from the first access point according to the determined current ability of the second access point, wherein a transmission power of the first signal on the first carrier is different than a transmission power of the second signal on the second carrier.

2. The method of claim 1, wherein determining a current ability of a second access point further comprises determining a spectrum frequency of the second access point.

3. The method of claim 2, wherein determining a spectrum frequency of the second access point comprises determining a frequency of a high power base station cell spectrum based on radio measurements of the second access point.

4. The method of claim 1, wherein determining a current ability of a second access point further comprises determining a coverage area of the second access point.

5. The method of claim 4, wherein determining the coverage area of the second access point is based on one or more of radio measurements performed by the first access point, measurement reports received from access terminals connected to the first access point, cell reselections of access terminals, connection failures of access terminals, and handover requests of access terminals.

6. The method of claim 1, wherein determining a current ability of a second access point further comprises determining a transmit power of the second access point.

7. The method of claim 6, wherein determining a transmit power of the second access point is based on information present in System Information Blocks (SIBs) received at the first access point.

8. The method of claim 1, wherein determining a current ability of a second access point further comprises determining a presence of a second access terminal on the second carrier.

9. The method of claim 8, wherein determining a presence of a second access terminal on the second carrier is based on one or more of radio measurements performed by the first access point, measurement reports received from access terminals connected to the first access point, cell reselections of the second carrier, connection failures of access terminals on the second carrier, and handover requests on the second carrier.

10. The method of claim 1, wherein determining a current ability of a second access point further comprises determining a presence of a first access terminal on the first carrier.

11. The method of claim 10, wherein determining a presence of a first access terminal on the first carrier is based on a radio connection with the first access point.

12. The method of claim 1, further comprising dynamically determining utilization of the second carrier by the first access point.

13. An apparatus of wireless communication, comprising:
   at least one processor; and:
   a memory coupled to the at least one processor, wherein the at least one processor is configured to:
      transmit a first signal on a first carrier from a first access point, determine, at the first access point, a current ability of a second access point on a second carrier, and transmit a second signal on the second carrier from the first access point, wherein transmitting the second signal is according to the determined current ability of the second access point, and wherein a transmission power of the first signal on the first carrier is different than a transmission power of the second signal on the second carrier.

14. The apparatus of claim 13, wherein the at least one processor configured to determine a current ability of a second access point is further configured to determine a spectrum frequency of the second access point.

15. The apparatus of claim 14, wherein the at least one processor configured to determine a current ability of a second access point is further configured to determine a frequency of a high power base station cell spectrum based on radio measurements of the second access point.

16. The apparatus of claim 13, wherein the at least one processor configured to determine a current ability of a second access point is further configured to determine a coverage area of the second access point.

17. The apparatus of claim 16, wherein the at least one processor is configured to determine the coverage area of the second access point based on one or more of radio measurements performed by the first access point, measurement reports received from access terminals connected to the first access point, cell reselections of the second carrier, connection failures of access terminals on the second carrier, and handover requests on the second carrier.

18. The apparatus of claim 13, wherein the at least one processor configured to determine a current ability of a second access point is further configured to determine a transmit power of the second access point.

19. The apparatus of claim 18, wherein the at least one processor is configured to determine the transmit power of the second access point based on information present in System Information Blocks (SIBs) received at the first access point.

20. The apparatus of claim 13, wherein the at least one processor configured to determine a current ability of a second access point is further configured to determine a presence of a second access terminal on the second carrier.

21. The apparatus of claim 20, wherein the at least one processor is configured to determine the presence of the second access terminal on the second carrier based on one or more of radio measurements performed by the first access point, measurement reports received from access terminals connected to the first access point, cell reselections of the second carrier, connection failures of access terminals on the second carrier, and handover requests on the second carrier.

22. The apparatus of claim 13, wherein the at least one processor configured to determine a current ability of a second access point is further configured to determine a presence of a first access terminal on the first carrier.

23. The apparatus of claim 22, wherein the at least one processor is configured to determine the presence of the first access terminal on the first carrier based on a radio connection with the first access point.

24. The apparatus of claim 13, wherein the at least one processor is further configured to dynamically determine utilization of a spectrum frequency of the second access point.

25. An apparatus of wireless communication, comprising:
means for transmitting a first signal on a first carrier from a first access point;
means for determining, by the first access point, a current ability of a second access point on a second carrier; and
means for transmitting a second signal on the second carrier from the first access point according to the determined current ability of the second access point, wherein a transmission power of the first signal on the first carrier is different than a transmission power of the second signal on the second carrier.

26. A non-transitory computer readable medium, comprising machine-executable code for causing a computer to:
transmit a first signal on a first carrier from a first access point;
determine, by the first access point, a current ability of a second access point on a second carrier; and
transmit a second signal on the second carrier from the first access point according to the determined current ability of the second access point, and wherein a transmission power of the first signal on the first carrier is different than a transmission power of the second signal on the second carrier.

27. The method of claim 1, wherein the transmission power of the second signal is based on identifying radio link failures or handovers caused by the first access point on the second carrier.

28. The method of claim 27, further comprising:
determining that the first access point is no longer receiving handover failure reports for the radio link failures or hand-in requests for the handovers to the first access point for access terminals served by the second access point on the second carrier; and
increasing the transmission power of the second signal on the second carrier in response to the determining.

* * * * *